United States Patent Office 3,376,275
Patented Apr. 2, 1968

3,376,275
URETHANES IN FILMS TO IMPROVE
SLIDING PROPERTIES
Friedrich Bayerlein, Rudolf Keller, and Dieter Mahling, Ludwigshafen (Rhine), Peter Becker, Worms, and Conrad Gajek and Hans Wilhelm, Ludwigshafen (Rhine), Germany, assignors to Badische Anilin- & Soda-Fabrik Aktiengesellschaft, Ludwigshafen (Rhine), Germany
No Drawing. Filed Dec. 17, 1963, Ser. No. 331,118
Claims priority, application Germany, Dec. 22, 1962,
B 70,117
5 Claims. (Cl. 260—80.3)

This invention relates to molding materials of polymers or copolymers of ethylenically unsaturated compounds whose surface condition is improved by addition of substituted urethanes.

It is known that the sliding properties of molded articles, for example sheets of polyolefins, such as polyethylene, can be improved by adding fatty acid amides, as for example oleamide or erucic amide. Sticking together of films, known as blocking, is not prevented by such additives.

It is also known that additions of ethylene distearylamide prevent blocking of films of polyolefins but that they improve only inadequately the sliding properties of such films.

In the case of sheets and films of copolymers containing polar groups, for example ethylene-vinyl acetate copolymers, the said additions are however practically without effect.

We have now found that molding materials of polymers or copolymers (hereinafter referred to as "polymers") of ethylenically unsaturated hydrocarbons slide very well without blocking when they contain compounds having the general formula R—X—R'—X—R" wherein R and R" represent cyclohexyl or alkyl of 1–20 carbon atoms, R' represents a member selected from the group consisting of hexamethylene, phenylene, tolylene, diphenylene methane, and naphthylene, and X represents a urethane group of the formula —HNCOO—.

The term "alkyl radicals" includes not only straight-chain compounds but also branched compounds. Preferred aromatic radicals are phenyl, diphenylmethyl and naphthyl; these radicals may be substituted with alkyl radicals containing 1 to 7 carbon atoms. The urethane compounds act as sliding and antiblocking agents Examples of such compounds are:

hexamethylene-1,6-bis-(n-octylurethane),
hexamethylene-1,6-bis-(n-heptylurethane),
hexamethylene-1,6-bis-(isopropylurethane),
hexamethylene-1,6-bis-(stearylurethane),
hexamethylene-1,6-bis-(cyclohexylurethane),
hexamethylene-1,6-bis-(ethylurethane),
hexamethylene-1,6-bis-(butylurethane),
phenylstearylurethane, toluene - 2,4 - bis-(octylurethane) and triphenylmethane-4,4',4"-trioctylurethane.

The compounds having the formula R—NHCOO—R' may be prepared for example by reaction of suitable isocyanates with aliphatic alcohols having one to twenty carbon atoms, or by reaction of chlorocarbonic esters of suitable monohydric or polyhydric alcohols with suitable amines. Urethanes whose melting point is higher than 70° C. and not higher than the processing temperature of the polymer to be improved are particularly suitable.

The production of the urethanes is not the subject of the present invention.

The urethane compounds may be used according to the invention in amounts of about 0.01 to 2% by weight.

For most purposes, amounts of 0.02 to 0.12% by weight, with reference to the total weight of the polymer, are advantageous. For special purposes it is possible to use larger or smaller amounts.

The urethanes may be mixed with the polymers in any way by conventional methods. Mixing is preferably effected on rollers, calenders or by means of extruders. The urethanes to be used according to the new invention may if desired also be added prior to polymerization.

Thermoplastic polymers of ethylenically unsaturated compounds which may be modified according to this invention may for example be prepared by known polymerization methods from: ethylene, propylene, acrylic esters, such as methyl acrylate, ethyl acrylate, methyl methacrylate and ethyl methacrylate; vinyl esters, such as vinyl acetate and vinyl propionate; alkyl vinyl ether, such as methyl vinyl ether, ethyl vinyl ether and propyl vinyl ether.

The polymers may contain other additives, such as the conventional stabilizers, antistatics, pigments, dyes, plasticizers and fillers, in addition to the urethane compounds to be used according to this invention.

The improved polymers are suitable for example for the production of molded articles by injection or extrusion processes, but particularly for the production of sheets and films.

The invention is further illustrated by the following examples in which the parts specified are parts by weight.

EXAMPLE 1

99.7 parts of a copolymer prepared by a conventional method at a pressure of more than 1000 atmospheres from 83 parts of ethylene and 17 parts of vinyl acetate (melt index (MI) of the copolymer 0.7) are mixed in a blade kneader at 160° to 170° C. with 0.3 part of hexamethylene-1,6-bis-(stearylurethane). After a kneading period of five minutes, the product is extruded in a screw extruder heated to 130° C. to 170° C. to strands, which are granulated. A tube is prepared from the granulate in a conventional way with a commercial extruder heated to 130° to 160° C. The tube is inflated after it leaves the extruder die and cooled by a uniform stream of air, drawn upwardly by means of two nip rollers and wound up. The tubular film may be wound up easily. It is transparent, slides well (sliding value: 50 g.) and has no tendency to block even at elevated temperature, e.g., at 60° C. (blocking value at 60° C.: 200 g.). Sheets or films prepared from the tubular film may be printed and heat-sealed well.

For purposes of comparison, the experiment is repeated without adding a lubricant. Only defective pieces of film are obtained because the tubular film adheres strongly to the squeeze rollers and the take-up rollers and consequently is conveyed irregularly; it tears frequently and cannot be wound up without wrinkles. Blocking and sliding values cannot be determined by the conventional methods of measurement.

Sliding and blocking values are determined by the following methods:

Determination of sliding properties

A piece of film is laid on a carriage and secured with adhesive tape. A second piece of film, which has been treated with a pressure-sensitive adhesive, is folded around a slide and stuck thereto. The slide, whose dimensions are such that it has a weight of 8 g./sq. cm. is connected by a cord with a device which transforms the tensile forces occurring into pressure fluctuations. The carriage, which runs on rails, is then drawn away at a uniform speed of 1 cm./sec. The film attached to the slide thus slides over the film attached to the carriage. The resistance is recorded by a pressure recorder.

Measurement of the blocking value

Two pieces of film are superposed and pressed together at 60° C. under a load of 80 g./sq. cm. The films are cut into strips 15 mm. in width, stuck to self-adhesive tape to strengthen them, and pulled apart in a tension tester at a speed of 80 mm./minute. The force in g which is necessary for this purpose is measured.

The blocking value is taken as the mean value of ten individual measurements.

EXAMPLE 2

99.8 parts of a copolymer (melt index $MI_2$ 1.5) prepared by a conventional method and consisting of 80 parts of ethylene and 20 parts of ethyl acrylate is mixed as described in Example 1 with 0.2 part of hexamethylene-1,6-bis-(cyclohexylurethane) and extruded and granulated in the usual way. The granulate is processed into a flat sheet in an extruder having a flat sheeting die, the temperature of the extruder being 180° to 210° C. and the temperature of the cooling rollers being 40° to 60° C. The sheet is transparent and may be wound up well. It slides well (sliding values: 75 g.), has no tendency to block (blocking value at 60° C: 180 g.) and may be printed and heat-sealed well.

If the same amount of oleamide be used as lubricant instead of the specified diurethane, the production of a flat sheet from the said copolymer offers difficulty because the sheet sticks to the metal parts of the sheet take-off mechanism and is wrapped onto the metal rollers in the wrong direction or tears. It blocks so strongly and slides so badly that the measuring methods fail.

EXAMPLE 3

A solution of 0.2 part of hexamethylene-1,6-bis-ethylurethane in 1.5 parts of methanol is mixed well with 99.8 parts of a granulated copolymer of 88 parts of ethylene and 12 parts of acrylonitrile (melt index $MI_2$ 4) in a commercial paddle mixer. The granulate is spread out in the air so that adherent solvent evaporates. A blown film is made from the granulate by a conventional method. Its blocking value is less by the factor 3.2 and its sliding value is less by the factor 4.1 than the values for a blown film from the same copolymer which does not contain the additive according to this invention.

EXAMPLE 4

A film having a thickness of 40 microns is blown under conventional conditions from a high-pressure polyethylene (density 0.918, melt index $MI_2$ 1.5). The blocking value of the film is 500 g. and the sliding value is 210 g.

Before blowing, 0.08% of toluene-2,4-bis-(n-octylurethane) is added to the said high-pressure polyethylene in the way described in Example 1. A film prepared therefrom has a blocking value of 200 g. and a sliding value of 60 g.

EXAMPLE 5

A film 40 microns in thickness and prepared from a high-pressure polyethylene (density 0.924, melt index $MI_2$ 1.5) has, when no antiblocking agent or lubricant has been added, a blocking value of 440 g. and a sliding value of 130 g. After 0.08% of hexamethylene-1,6-bis-(octylurethane) has been added in the way described in Examples 1 to 4, the blocking value decreases to 70 g. and a sliding value to 30 g.

EXAMPLE 6

A high-pressure polyethylene (density 0.93, melt index $MI_2$ 4) which contains 0.04% by weight of oleamide as lubricant is blown into a film 40 microns in thickness. The film has a blocking value of 410 g. and a sliding value of 40 g. In contrast to this, a film which contains, instead of oleamide, 0.04% of hexamethylene-1,6-bis-(butylurethane), incorporated as described in Example 1, has a blocking value of 200 g. and a sliding value of 30 g.

We claim:
1. A composition of matter containing a mixture of a thermoplastic polymer A of ethylenically unsaturated compounds selected from the group consisting of ethylene, propylene, acrylic esters, methacrylic esters, acrylonitrile, methacrylonitrile, vinyl esters, vinyl ethers and mixtures thereof and a compound B selected from the group consisting of triphenylmethane - 4,4',4'' - trialkylurethane wherein the alkyl groups respectively have 1–20 carbon atoms and a compound of the formula

$$R\text{---}X\text{---}R'\text{---}X\text{---}R''$$

wherein R and R'' represent a member selected from the group alkyl of 1–20 carbon atoms and cyclohexyl; R' represents a member selected from the group consisting of hexamethylene, phenylene, tolylene, diphenylene methane, and naphthylene, and X represents a urethane group of the formula —HNCOO—, the compound B being present in an amount of from 0.01 to 2% by weight with reference to the total weight of said polymer.

2. The composition in accordance with claim 1 wherein the compound B is hexamethylene-1,6-bis-(stearylurethane).

3. The composition in accordance with claim 1 wherein the compound B is hexamethylene-1,6-bis-(cyclohexylurethane).

4. The composition in accordance with claim 1 wherein the compound B is hexamethylene-1,6-bis-ethylurethane.

5. The composition in accordance with claim 1 wherein the compound B is toluene 2,4-bis-(n-octylurethane).

References Cited

Campbell, A. W. et al.: Industrial and Engineering Chem., vol. 45, No. 1, pages 125–130 (1953).

JOSEPH L. SCHOFER, *Primary Examiner.*

M. L. BERCH, S. LEVIN, *Assistant Examiners.*